I. D. BEACH, Jr.
Nut-Lock.
No. 224,630.　　　Patented Feb. 17, 1880.
Fig. 1.
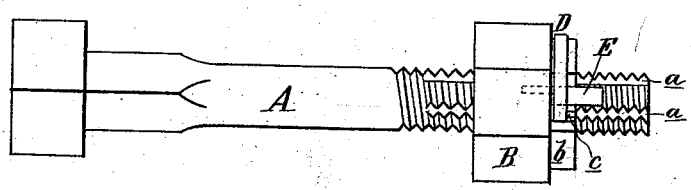
Fig. 2.　　　Fig. 3.
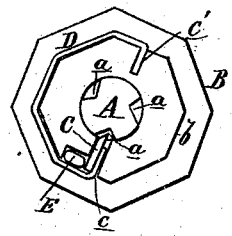 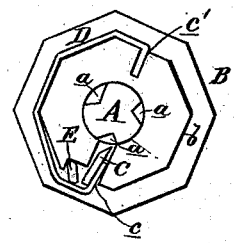
Fig. 4.
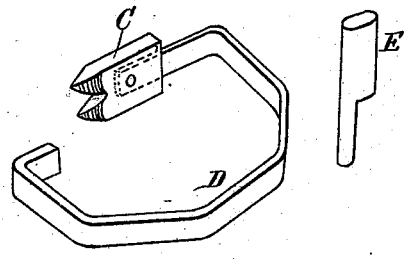
WITNESSES:
Henry N. Miller
C. Sedgwick
INVENTOR:
I. D. Beach Jr.
BY Munn & Co.
ATTORNEYS.

UNITED STATES PATENT OFFICE.

ISAAC D. BEACH, JR., OF MILLERSVILLE, MISSOURI, ASSIGNOR TO HIMSELF AND T. T BEACH, OF SAME PLACE.

NUT-LOCK.

SPECIFICATION forming part of Letters Patent No. 224,630, dated February 17, 1880.

Application filed October 29, 1879.

*To all whom it may concern:*

Be it known that I, ISAAC D. BEACH, Jr., of Millersville, in the county of Cape Girardeau and State of Missouri, have invented a new and Improved Nut-Lock, of which the following is a specification.

Figure 1 is a longitudinal side elevation of the device applied to a bolt. Fig. 2 is a plan of the same, showing the nut locked to the bolt. Fig. 3 is a plan of the same, showing the nut unlocked. Fig. 4 represents the spring and key in enlarged perspective.

Similar letters of reference indicate corresponding parts.

The object of this invention is to provide a simple and efficient device for securing nuts upon bolts so that they cannot be jarred or shaken off.

In the drawings, A represents the bolt, having its screw portion intersected by the grooves $a$. B is the nut, cut away so that the shoulder $b$ is formed upon it, and provided with opposite radial slots $c\ c'$, that extend through the shoulder $b$. C is the locking-pin, with its free end forked or notched to fit the screw-thread of the bolt A, and having the points of the forks beveled on one face, so that when the pin is in position the nut cannot be moved upward, but, because of the beveling and bifurcation, may be moved downwardly. D is the curved spring, to one end of which the pin C is attached, while the other end of the said spring D enters the radial slot $c'$, opposite to the radial slot $c$, in which the pin C is entered, the said spring D being thus made to lie close against the shoulder $b$, out of the way of interference with the crow or wrench that may be applied to the nut B.

A corner of the shoulder $b$ is cut away where it is intersected by the slot $c$, and a hole is there bored into the nut B for the reception of the shank of the key E, which key E lies flat against the shoulder $b$, and on the inside of the spring D, when the nut B is locked, so that it cannot be turned upward by the engagement of the pin C in one of the grooves $a$ of the bolt A, as shown in Fig. 2. In this position the spring D holds the pin C in place, so that the nut B cannot be turned off the bolt; but the engagement of the locking-pin C with grooves $a$ does not prevent the downward turning of the nut B, for the fork of the pin C will readily move downward on the screw-threads of the bolt A, and the beveled face of the said fork causes the pin C to lift out of the grooves of the bolt A as the nut B is turned downward. To unlock the nut B, in order to remove it, one has simply to turn the key E, so that it will press the spring D outward and disengage and hold the locking-pin C from the bolt A.

I do not broadly claim a spring locking-pin whose end enters through the nut into a groove in the bolt.

I am aware that it is not new to pivot a dog in the recess of the nut and hold it in contact with the bolt-thread by a spring, or to provide a nut with a pawl on a spring-actuated spindle to engage grooves in the bolt; but

What I claim as new and of my invention is—

The combination of the grooved bolt A, the nut B, having shoulder $b$, provided with radial slots $c\ c'$, the curved spring D, secured as described, the locking-pin C, having the points of its forks beveled on one side, and the key E, as set forth.

ISAAC DAVIS BEACH, JR.

Witnesses:
WILLIAM S. CRAIN,
A. J. CRAIN.